United States Patent

[11] 3,571,669

| | | | |
|---|---|---|---|
| [72] | Inventor | Gordon R. Fleming Pontiac, Mich. | |
| [21] | Appl. No. | 710,033 | |
| [22] | Filed | Mar. 4, 1968 | |
| [45] | Patented | Mar. 23, 1971 | |
| [73] | Assignee | Energy Conversion Devices, Inc. Troy, Mich. | |

[54] CURRENT CONTROLLING DEVICE UTILIZING SULPHUR AND A TRANSITION METAL
8 Claims, 4 Drawing Figs.

[52] U.S. Cl..................................................... 317/234,
307/324, 252/62.3
[51] Int. Cl..................................................... H01l 9/00
[50] Field of Search......................................... 317/234.10,
235.25, 235.28, 235.48.3, 235.48.7; 338/20;
106/47; 252/62.3 (G)

[56] References Cited
UNITED STATES PATENTS
3,271,591  9/1966  Ovshinsky...................  317/235

*Primary Examiner*—Jerry D. Craig
*Attorney*—Wallestein, Spangenberg, Hattis & Strampel ABSTRACT: A current-controlling device for an electrical circuit including a semiconductor material and electrodes in contact therewith, wherein the semiconductor material has a high electrical resistance, wherein the high electrical resistance is substantially instantaneously decreased to a low electrical resistance in response to a voltage above a threshold voltage value, wherein the low electrical resistance is immediately returned to the high electrical resistance in response to a decrease in current below a minimum current holding value, and wherein the semiconductor material consists essentially of sulfur and a transition metal, as for example, vanadium.

PATENTED MAR 23 1971 3,571,669

INVENTOR

GORDON R. FLEMING

Wallenstein, Spangenberg
Hattis & Strampel

BY

ATTY.

CURRENT CONTROLLING DEVICE UTILIZING SULPHUR AND A TRANSITION METAL

The invention of this application is related to and is an improvement upon the invention disclosed in Ovshinsky, U.S. Pat. No. 3,271,591 issued Sept. 6, 1966.

The principal object of this invention is to provide an improved current-controlling device for accomplishing the current controlling or switching functions substantially as performed by the current-controlling device of the aforementioned patent but in an improved manner. In this connection an improved semiconductor material is here utilized, it consisting essentially of sulfur and a transition metal. While various transition metals may be utilized in this semiconductor material, exceptionally fine results are obtained when vanadium is utilized as the transition metal in conjunction with sulfur. The improved current-controlling device of this invention has more stable characteristics at higher temperatures.

Other objects and advantages of this invention will become apparent to those skilled in the art upon reference to the accompanying specification, claims and drawing in which:

Figure 1:
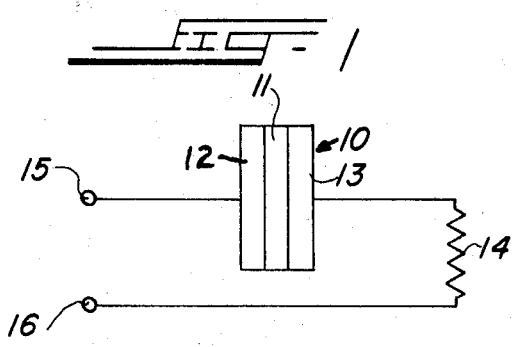
FIG. 1 is a diagrammatic illustration of the current-controlling device of this invention connected in series in a load circuit.

Referring now to the diagrammatic illustration of FIG. 1, the current-controlling device of this invention is generally designated at 10. It includes a semiconductor material 11 which is of one conductivity type and which is of high electrical resistance and a pair of electrodes 12 and 13 in contact with the semiconductor material 11 and having a low electrical resistance of transition therewith. The electrodes 12 and 13 of the current-controlling device 10 connect the same in series in an electrical load circuit having a load 14 and a pair of terminals 15 and 16 for applying power thereto. The power supplied may be a DC voltage or an AC voltage as desired.

Figure 2:
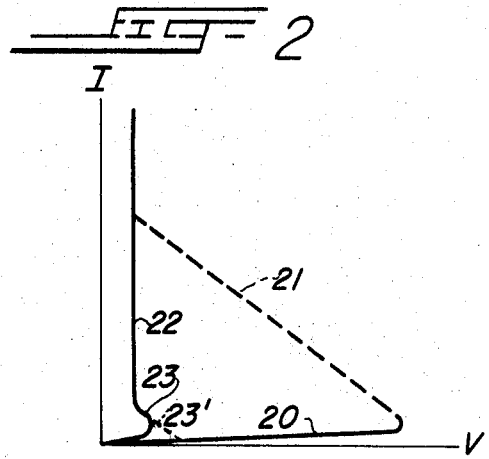
FIG. 2 is a voltage current curve illustrating the operation of the current-controlling device of this invention in a DC load circuit.

FIG. 2 is an I–V curve illustrating the DC operation of the current-controlling device 10. The device is normally in its high resistance condition and as the DC voltage is applied to the terminals 15 and 16 and increased the voltage current characteristics of the device are illustrated by the curve 20, the electrical resistance of the device being high and substantially blocking the current flow therethrough. When the voltage is increased to a threshold voltage value, the high electrical resistance in the semiconductor material substantially instantaneously decreases in at least one path between the electrodes 12 and 13 to a low electrical resistance, the substantially instantaneous switching being indicated by the curve 21. This provides a low electrical resistance or conducting condition for conducting current therethrough. The low electrical resistance is many orders of magnitude less than the high electrical resistance. The conducting condition is illustrated by the curve 22 and it is noted that there is a substantially linear voltage current characteristic and a substantially constant voltage characteristic which are the same for increase and decrease in current. In other words, current is conducted at a substantially constant voltage. In the low resistance current conducting condition the semiconductor material has a voltage drop which is a minor fraction of the voltage drop in the high resistance-blocking condition near the threshold voltage value.

As the voltage is decreased, the current decreases along the line 22 and when the current decreases below a minimum current holding value, the low electrical resistance of said at least one path immediately returns to the high electrical resistance as illustrated by the curves 23, 23' to reestablish the high resistance-blocking condition. In DC operation, the switching from the low resistance-conducting condition to the high resistance-blocking condition occurs along the curve 23' and sometimes in connection with AC operation the switching occurs along the solid curve 23. In either instance, however, the low electrical resistance immediately returns to the electrical high resistance when the current falls below the minimum current holding value.

Figure 3:
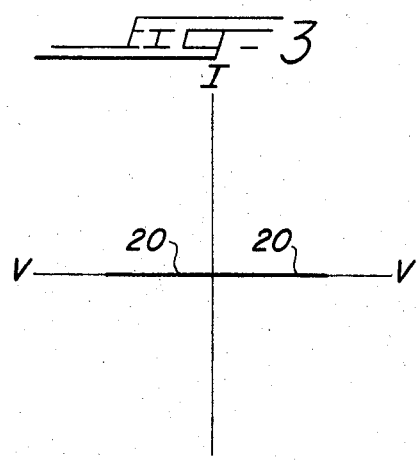
FIGS. 3 and 4 are voltage current curves illustrating the operation of the current-controlling device when included in an AC load circuit.
Figure 4:
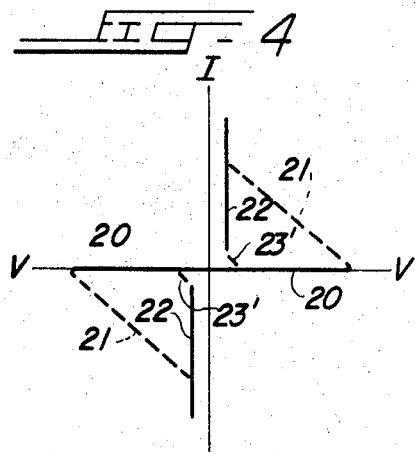

The current-controlling device 10 of this invention is symmetrical in its operation, it blocking current substantially equally in each direction, and the switching between the blocking and conducting conditions being extremely rapid. In the case of AC operation the voltage current characteristics for the second half cycle of the AC current would be in the opposite quadrant from that illustrated in FIG. 2. The AC operation of the device is illustrated in FIGS. 3 and 4. FIG. 3 illustrates the device 10 in its blocking condition where the peak voltage of the AC voltage is below the threshold voltage value of the device, the blocking condition being illustrated by the curve 20 in both half cycles. When, however, the peak voltage of the applied AC voltage increases above the threshold value of the device, the device substantially instantaneously switches along the curves 21 to the conducting condition illustrated by the curves 22, the device switching during each half cycle of the applied AC voltage. As the applied AC voltage nears zero so that the current through the device falls below the minimum current holding value, the device switches along the curve 23 or 23' from the low electrical resistance condition to the high electrical resistance condition, illustrated by the curve 20, this switching occurring near the end of each half cycle.

For a given configuration of the device 10, the high electrical resistance may be about 1 megohm and the low electrical resistance about 10 ohms, the threshold voltage value may be about 20 volts and the voltage drop across the device in the conducting condition may be less than 1 volt, and the switching times may be in nanoseconds or less.

The semiconductor material 11 which affords the above switching operations consists essentially of sulfur and a transition metal which is often referred to as having a D-band, as for example, titanium, vanadium, chromium, manganese, zirconium and the like. Particularly good results are obtained where sulfur is used with vanadium. The sulfur content should be high with respect to the vanadium content, as for example, a range in atomic percent of about 66⅔ percent to 80 percent sulfur and of about 33⅓ percent to 20 percent vanadium.

In the preparation of the semiconductor material, as for example, where sulfur and vanadium are involved, appropriate amounts of sulfur and vanadium in fine particulate form are sealed in a quartz container and heated for a period of about 24 hours to a temperature not in excess of 500° C., a temperature of about 400° C. being preferred. The material is then allowed to cool to room temperature and the quartz container opened. The resulting product is a fine particulate black powder.

When such powder is placed between the electrodes and appropriate voltages are applied thereto, the above mentioned switching operations are obtained. The power may also be compacted into pellets and arranged between the electrodes to obtain the above mentioned switching. Further, the powder may also be incorporated in a suitable paint and applied as layers or films to the electrodes to obtain the above mentioned switching. In addition, the powder may be sputtered from a suitable cathode receptacle for applying a thin film of the semiconductor material on the electrodes for performing the above-mentioned switching. When the semiconductor material is so sputtered onto the electrodes, it is deposited in an amorphous state.

Since sulfur is an element which is capable of forming polymeric structures, it is believed that the sulfur in conjunction with the vanadium associated therewith forms a semiconductor material having a polymeric structure, whether it be crystalline or amorphous. The above described manners for making semiconductor materials from sulfur and vanadium can also be utilized in making semiconductors having sulfur and other transition metals.

The electrodes 12 and 13 may be formed of any suitable electrical conducting material, preferably high melting point materials, which does not react unfavorably with the semiconductor material 10, such as tantalum, graphite, niobium, tungsten, molybdenum or the like. These electrodes are usually relatively inert with respect to the aforementioned semiconductor material.

It is believed that the breakdown by the applied voltage involved in the switching from the high electrical resistance to the low electrical resistance is essentially an electrical breakdown, and that the conducting process in the low electrical resistance condition is electronic conduction.

While for purposes of illustration several forms of this invention have been disclosed, other forms thereof may become apparent to those skilled in the art upon reference to this disclosure and, therefore, this invention is to be limited only by the scope of the appended claims.

I claim:

1. A current-controlling device for an electrical circuit including a semiconductor material and electrodes in contact therewith, wherein said semiconductor material has a high electrical resistance to provide a blocking condition for substantially blocking current therethrough, wherein said high electrical resistance in response to a voltage above a threshold voltage value substantially instantaneously decreases in at least one path between the electrodes to a low electrical resistance which is orders of magnitude lower than the high electrical resistance to provide a conducting condition for conducting current therethrough, and wherein the semiconductor material in the low electrical resistance conducting condition has a voltage drop which is a fraction of the voltage drop in the high electrical resistance-blocking condition near the threshold voltage valve, the improvement wherein said semiconductor material consists essentially of sulfur and a transition metal and wherein the range in atomic percent of sulfur is about 80 percent to 66⅔ percent and of the transition metal is about 20 percent to 33⅓ percent.

2. A current-controlling device as defined in claim 1 wherein said semiconductor material consists essentially of sulfur and vanadium.

3. A current-controlling device as defined in claim 2 wherein said semiconductor material is substantially amorphous.

4. A current-controlling device as defined in claim 2 wherein said low electrical resistance of said at least one path of the semiconductor material in the conducting condition immediately returns to the high electrical resistance in response to a decrease in current below a minimum current holding value which reestablishes the blocking condition.

5. A current-controlling device as defined in claim 4 wherein the high electrical resistance blocking condition is decreased to the low electrical resistance conducting condition during each half cycle responsive to the instantaneous voltage of an AC voltage above a threshold voltage value, and wherein the low electrical resistance conducting condition is returned to the high electrical resistance-blocking condition during each half cycle responsive to the instantaneous current of an AC current below a minimum current-holding value.

6. A current-controlling device as defined in claim 1 wherein said semiconductor material is substantially amorphous.

7. A current-controlling device as defined in claim 1 wherein said low electrical resistance of said at least one path of the semiconductor material in the conducting condition immediately returns to the high electrical resistance in response to a decrease in current below a minimum current-holding value which reestablishes the blocking condition.

8. A current-controlling device as defined in claim 7 wherein the high electrical resistance-blocking condition is decreased to the low electrical resistance-conducting condition during each half cycle responsive to the instantaneous voltage of an AC voltage above a threshold voltage value, and wherein the low electrical resistance conducting condition is returned to the high electrical resistance-blocking condition during each half cycle responsive to the instantaneous current of an AC current below a minimum current-holding value.